UNITED STATES PATENT OFFICE.

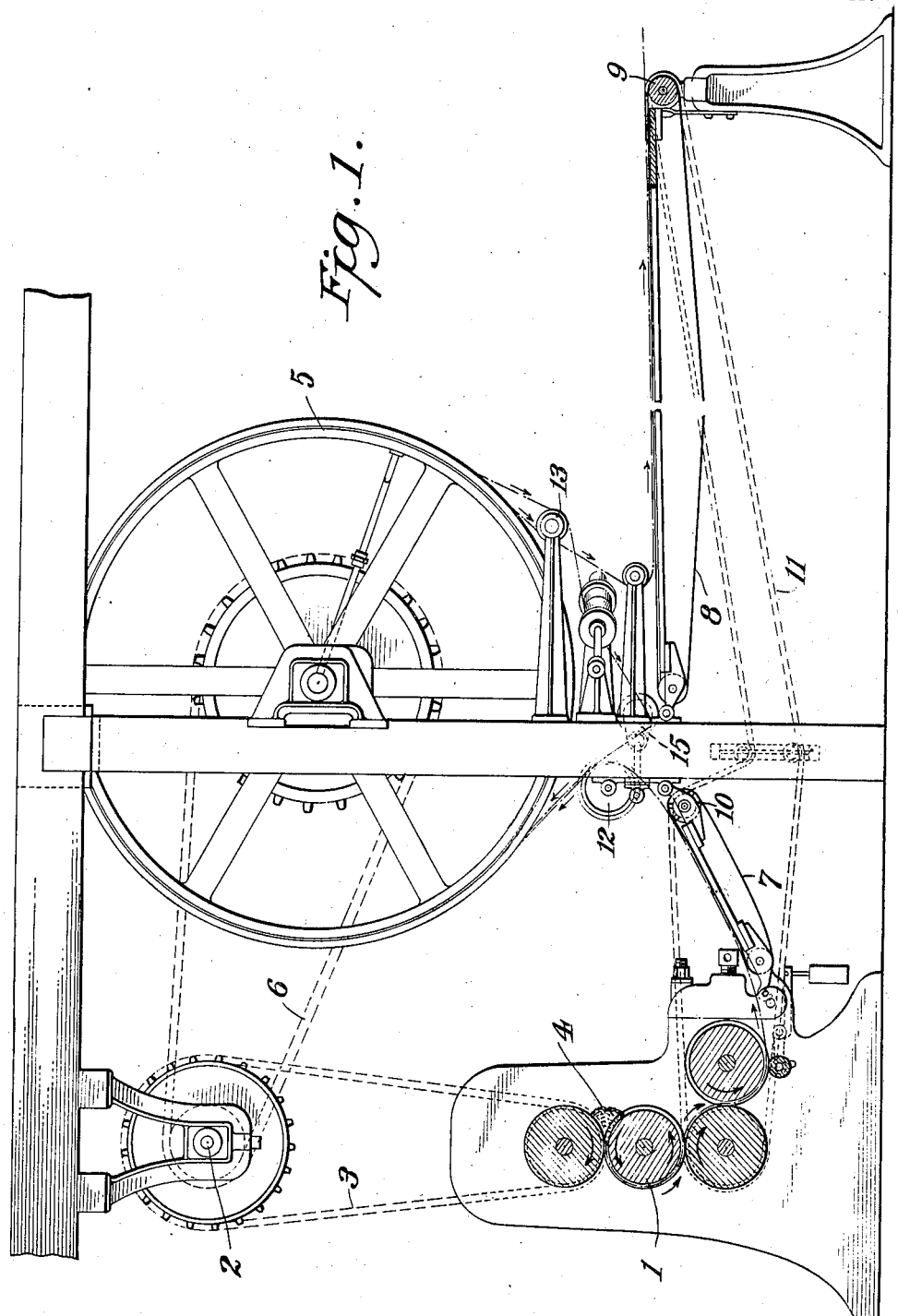

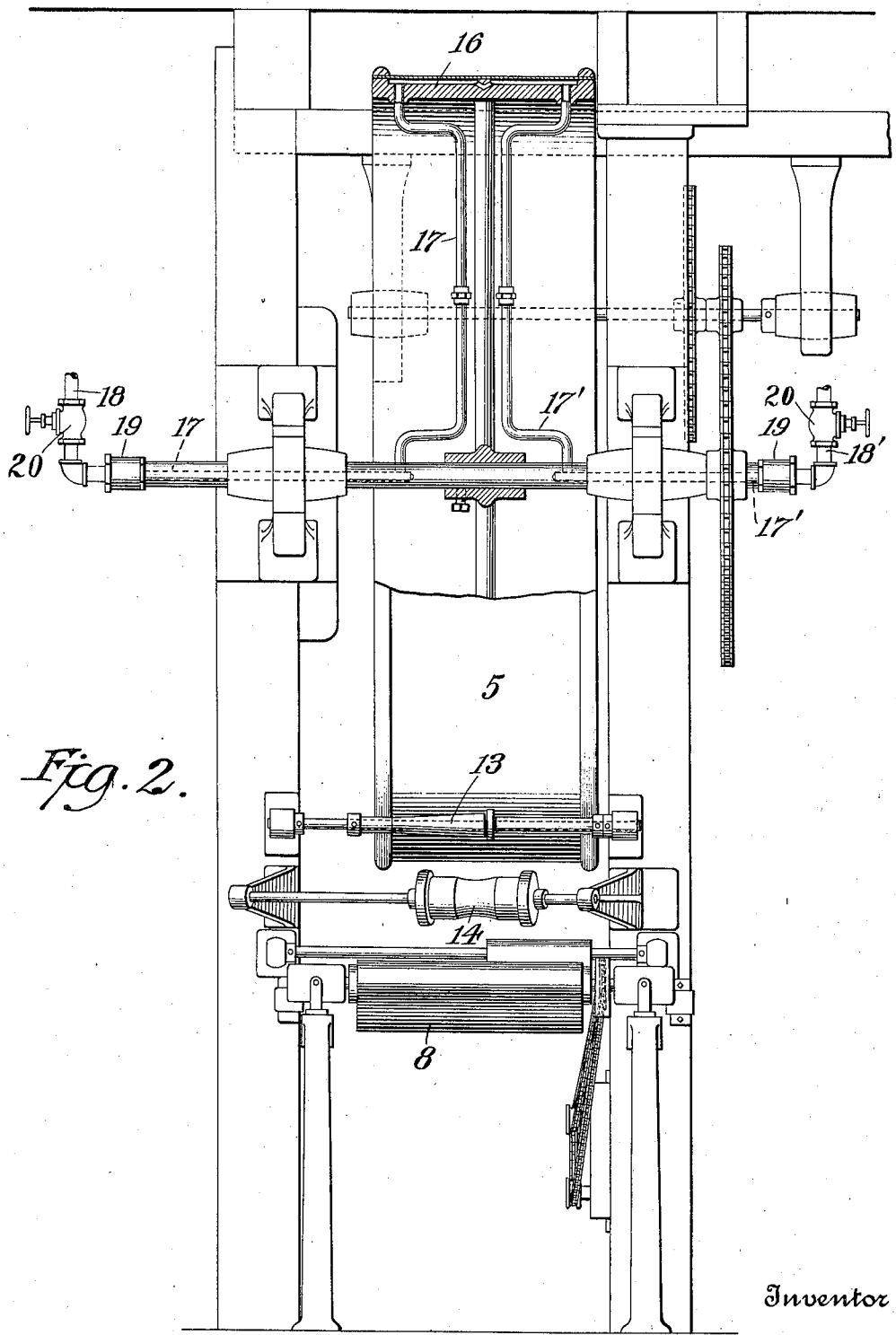

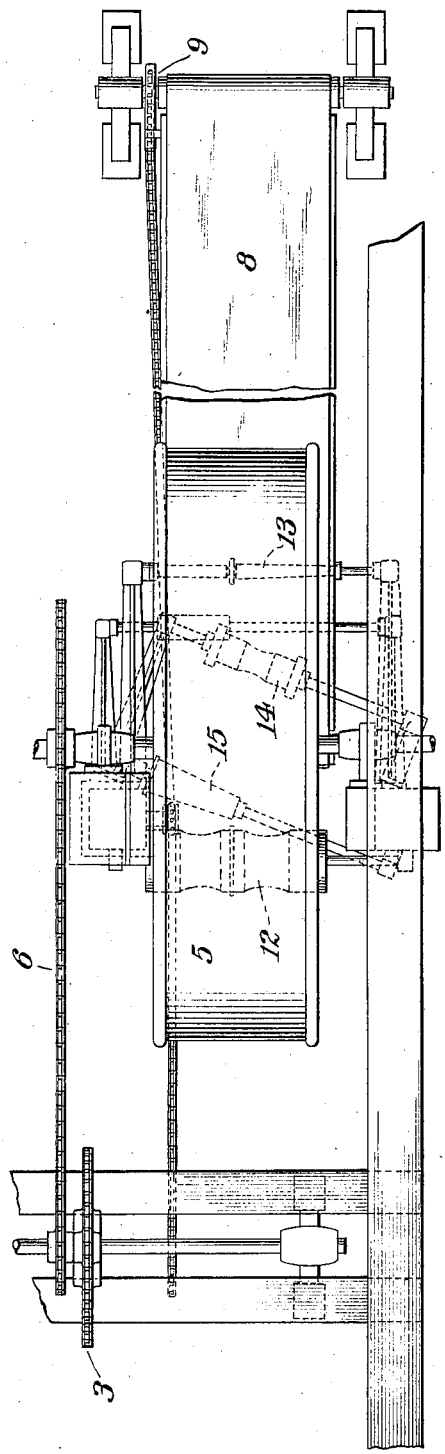

JOHN J. SHEA, OF HARTFORD, CONNECTICUT, ASSIGNOR TO THE HARTFORD RUBBER WORKS COMPANY, A CORPORATION OF CONNECTICUT.

METHOD OF TREATING VULCANIZABLE PLASTICS.

1,343,377.  Specification of Letters Patent.  Patented June 15, 1920.

Application filed April 24, 1915. Serial No. 23,560.

*To all whom it may concern:*

Be it known that I, JOHN J. SHEA, a citizen of the United States, and a resident of Hartford, in the county of Hartford and State of Connecticut, have invented a new and useful Method of Treating Vulcanizable Plastics, of which the following is a full, clear, and exact description.

This invention relates to a method of making articles formed wholly or partly of a vulcanizable plastic, and has for its primary object the subjection of the plastic to the action of a medium under a controllable temperature during some period between its formation and storing or other subsequent treatment.

As an illustration of the advantage of a controllable temperature at such a stage in the manufacture of vulcanizable articles consideration may be directed to the manufacture of such articles as are wholly or partly formed of vulcanized rubber wherein the general practice, in order to condition the rubber to facilitate its being more easily shaped into the required form given the article, is to first subject it to a warming process. This treatment causes a substantial expansion of the plastic mass and when the article is formed of the plastic in its heated condition and subsequently allowed to slowly cool as is the usual practice it shrinks in an irregular manner so that the article as finally formed is not of the exact or uniform shape desired.

Such a controllable temperature is of special value in the manufacture of tire treads. The treads are usually somewhat crescent-shape in transverse section and a common method of constructing them is to calender out the rubber stock by the employment of calender rolls having suitable circumferential depressions to give the desired crescent-shape to the band of material formed. To facilitate the manipulation of the rubber compound it is the usual practice to maintain the rolls at suitable temperatures and to subject the rubber stock to a warming up treatment by means of other rolls before subjecting it to the action of the calender rolls. The strip of stock as it comes from the calender rolls is cut into suitable lengths which are placed between leaves of books where they are allowed to cool slowly. The tread stock cooled in this way has been found to vary in shrinkage as much as twenty-five points between the ends and the center of the lengths thus hooked, a point being one thousandth of an inch. A tread made from such stock would obviously be of a varying gage, and it is probable that many of the defects in tires can be attributed to this lack of uniformity of the treads.

I have found that by chilling or quickly cooling the stock as soon as it comes from the calender rolls the shrinkage is checked and made substantially uniform. I have obtained very satisfactory results by passing the stock in its warm condition as it leaves the calender rolls over cold metallic surfaces, but it is obvious that there are many other expedients for accomplishing this rapid cooling effect. As an instance of the benefits gained by the employment of my method I have reduced the temperature of the tread stock coming from the heated calenders approximately from 181 to 100 degrees, and thereby obtained such a checking of the shrinkage and uniformity thereof that it was only necessary to calender the stock seven or eight points heavier than was required, while without my process it would reasonably be necessary to run the stock forty points heavier than required. For instance if a gage of 250 center were desired, by the employment of my method it would be necessary to run the stock 258 points, whereas by the slow or gradual cooling process it would require 290 points. By this method I almost entirely avoid the inequality of gage resulting from uneven shrinkage, which in treads cooled by the usual method is so great in a considerable proportion of the stock as to necessitate its discard.

Although my method is not restricted to any particular type of apparatus, an appropriate type for carrying out my invention is shown in the accompanying drawings wherein;

Figure 1 is a side elevation partly in section of the machine;

Fig. 2 is an elevation partly in section looking toward the left in Fig. 1 on an enlarged scale, and Fig. 3 is a plan view of the major portion of the machine.

Any preferred or known type of calendering machine may be employed. In the present instance it is represented as comprising the four calender rolls 1, which travel in the respective directions indicated by the arrows and are driven from the shaft 2 by the transmission devices 3. The rubber compound is previously warmed in the usual manner and then placed between the uppermost pair of rolls where it forms a bank of material 4. This stock passes between the respective rolls in succession as indicated by the arrows and finally emerges from between the last pair in the form desired. The rolls are suitably grooved to give the required cross-sectional conformation to the rubber strip to adapt it for use as tire treads.

While there are numerous ways of cooling the stock as it leaves the rolls so that the desired checking and regulating of the shrinkage may be attained, I have shown in the present embodiment, a wheel or drum 5 of comparatively large diameter. This drum is driven through the intervention of the transmission 6 from the same shaft 2 that drives the calender rolls.

The stock is passed around this cooling drum, which is made of comparatively large diameter to insure contact between it and the rubber stock for a suitable length of time to permit a fall in the temperature of the stock to substantially that of the atmosphere. In order to increase this period of contact and to thereby enable a reduction in the diameter of the cooling drum to practical limits, the stock may be passed two or more times about the drum. In the present instance provision is made for the stock to travel about the drum twice, but it is obvious that it may be made to repeat its travel as many times as is desired.

The stock on leaving the calender rolls passes on an endless apron 7 and is carried thereby to the cooling drum 5, and on leaving this drum after passing thereabout the required number of times, as will later be described, is delivered to an endless apron 8. These aprons are provided respectively with the sprocket wheels 9 and 10, which are driven from the calender rolls by means of the chain 11. It will thus be seen that the drum 5, aprons 7 and 8, and calender rolls 1 are driven from a common shaft 2 through transmission devices whereby a uniform lineal speed is given to these several parts and any undue stretching or slacking of the calendered strip thereby prevented.

The stock on leaving the apron 7 passes around the idler 12 and then upon the cooling drum 5. After passing around this cooling drum it passes over the idlers 13, 14 and 15 and then back again around the cooling drum for a second time.

The idler 14 is provided with a groove and idler 15 is of conical formation and both are mounted at suitable angles to the axis of the drum for guiding the tread, so that it will assume a new position upon the drum to one side of that formerly assumed. The face of the drum is provided with double walls 16, suitably spaced to form a water jacket for cooling the outer wall which is preferably made of copper to provide a good conductor. The space between the walls may be brought in communication with a source of water supply, not shown, through means of the pipes 17 and 18. Other pipes 17'—18' are provided for carrying the water from the drum. The pipes 17 and 17' revolve with the drum while the pipes 18 and 18' remain stationary, and to provide for this, friction unions 19, of any preferred or well known type, are employed. The supply and exhaust conduits are provided with the control valves 20. This construction provides a means for the controllable circulation of water or other cooling medium from the source of supply through the pipes 18, thence through the pipes 17 to the cooling chamber forming the face of the drum. From here it passes through the pipes 17' and finally makes its exit through the pipe 18'.

It will thus be seen without further explanation of the operation of the machine that the stock on leaving the endless carrier 8 will be cooled to the desired temperature depending upon its original temperature, the temperature of the cooling medium and the period during which it remains in contact with the cooling surface of the drum. When it leaves the carrier 8 it may be cut into suitable lengths and booked or otherwise taken care of preliminary to its formation into treads or other articles for which it is intended. By thus cooling the stock by a uniformly operating method before it is cut into the desired lengths or otherwise treated, it is obvious that a more uniform shrinkage will be obtained and that the objectionable results caused by slowly cooling the cut strips while in the books will be avoided.

The essential of my invention consists in subjecting the vulcanizable plastic, after it has been given formation and before it has been booked, reeled, or otherwise stored or treated, to a comparatively sudden change in temperature, that is to say to a substantially greater rate of change of temperature than would be evidenced by merely bringing it under the influence of the surrounding atmosphere.

In carrying out such a process the medium may exert its influence through the coöperation with a metallic surface as above described, or it may be brought into direct contact with the plastic, in suitable instances, and while I have used the term vulcanizable plastic, I intend to include such plastics as gutta percha, balata, and the like, which in the strict sense are not usually vulcanized, but more strictly speaking are ordinarily subjected to a setting or hardening treatment.

I have found however, that satisfactory results are obtained, when the stock is to be cooled, by bringing the heated plastic into intimate contact with a metallic surface, which is simultaneously being subjected to the cooling action of water. By such means the heat contained in the formed plastic is rapidly transmitted to the contacting metallic surface, and from here it is rapidly carried off by the continually flowing water.

The plastic is preferably given formation by a continuous operation, and it is desirable to provide a means that will operate continually for effecting the rapid change in temperature of the formed plastic so that it may operate while the stock is continuing its travel after it has been formed. This is satisfactorily accomplished by the employment of the revolving drum whereby the stock advancing on the drum immediately after being formed will be in contact with a portion of the surface of the drum which is continually under the influence of the flowing medium on the opposite side thereof for effecting the desired change in its temperature.

Having thus described my invention, what I claim and desire to protect by Letters Patent is:

1. In the manufacture of sheet-like articles from hot plastic rubber, the art of reducing the shrinkage normally occurring during the cooling of the hot article, which consists in subjecting the article to the action of an agent adapted to rapidly absorb heat from the article.

2. A method of manufacturing tire treads from hot plastics adapted to shrink upon cooling, which comprises shaping the tread from a mass of the plastic, and eliminating a proportion of the shrinkage by rapid cooling.

3. A method of manufacturing tire treads from hot vulcanizable plastics adapted to shrink upon cooling, which comprises passing a mass of the plastic through heated calender rolls to shape the tread, and subsequently treating the tread to rapid cooling whereby a large proportion of the shrinkage is eliminated.

4. A method of manufacturing tire treads from hot vulcanizable plastic adapted to shrink upon cooling, which comprises shaping a continuous sheet of the plastic, and subjecting the said sheet to rapid cooling, whereby a large proportion of the shrinkage is eliminated.

Signed at Hartford, county of Hartford, and State of Connecticut, this 21 day of April, 1915.

JOHN J. SHEA.